(12) United States Patent
Yogev et al.

(10) Patent No.: US 11,313,497 B2
(45) Date of Patent: Apr. 26, 2022

(54) INSTALLATION FITTINGS FOR USE IN DOMESTIC WATER SUPPLY PIPE SYSTEMS

(71) Applicant: HULIOT AGRICULTURAL COOPERATIVE SOCIETY LTD, Upper Galilee (IL)

(72) Inventors: Oren Yogev, Upper Galilee (IL); Yariv Fichtelberg, Lower Galilee (IL)

(73) Assignee: HULIOT AGRICULTURAL COOPERATIVE SOCIETY LTD., Upper Galilee (IL)

( * ) Notice: Subject to any disclaimer, the term of this patent is extended or adjusted under 35 U.S.C. 154(b) by 7 days.

(21) Appl. No.: 17/285,830

(22) PCT Filed: Sep. 23, 2019

(86) PCT No.: PCT/IL2019/051049
§ 371 (c)(1),
(2) Date: Apr. 15, 2021

(87) PCT Pub. No.: WO2020/079673
PCT Pub. Date: Apr. 23, 2020

(65) Prior Publication Data
US 2021/0310590 A1    Oct. 7, 2021

(30) Foreign Application Priority Data
Oct. 15, 2018  (IL) .......................................... 262382

(51) Int. Cl.
*F16L 21/03*    (2006.01)
*F16L 13/02*    (2006.01)
*F16L 13/14*    (2006.01)

(52) U.S. Cl.
CPC ........... *F16L 21/03* (2013.01); *F16L 13/0209* (2013.01); *F16L 13/143* (2013.01)

(58) Field of Classification Search
CPC ..... F16L 21/03; F16L 37/092; F16L 37/0925; F16L 37/0926; F16L 37/0927; F16L 13/0209; F16L 13/143; F16L 33/30
See application file for complete search history.

(56) References Cited

U.S. PATENT DOCUMENTS

| 3,508,766 A | * | 4/1970 | Berg | .................... F16L 13/0263 285/21.1 |
| 4,773,678 A |   | 9/1988 | Canaud et al. | |

(Continued)

FOREIGN PATENT DOCUMENTS

| CA | 2466749 A1 | * | 5/2003 | .......... F16L 37/0927 |
| DE | 202011103877 U1 | * | 9/2011 | .......... F16L 37/0925 |

(Continued)

*Primary Examiner* — David Bochna
(74) *Attorney, Agent, or Firm* — Novick, Kim & Lee, PLLC; Harold L Novick; Hyun Woo Shin

(57) ABSTRACT

Installation fittings for use in a domestic water supply pipe system of a predetermined application class. The installation fittings have a composite structure including a housing manufactured from low end synthetic polymer material. The housing has at least one pipe end with a pipe tang fitted with a tubular socket manufactured from high end material. Suitable high end materials include high end synthetic polymers or metals.

19 Claims, 16 Drawing Sheets

(56) References Cited

U.S. PATENT DOCUMENTS

| | | | | |
|---|---|---|---|---|
| 5,346,261 | A * | 9/1994 | Abbema | F16L 13/0263 |
| | | | | 285/22 |
| 5,378,023 | A * | 1/1995 | Olbrich | B21D 39/04 |
| | | | | 285/24 |
| 5,791,698 | A * | 8/1998 | Wartluft | F16L 37/0925 |
| | | | | 285/105 |
| 6,279,966 | B1 | 8/2001 | Kondo et al. | |
| 6,439,620 | B1 | 8/2002 | Guest | |
| 2017/0015050 | A1 | 1/2017 | Hooberman et al. | |
| 2018/0017196 | A1* | 1/2018 | Jordan | F16L 37/0925 |
| 2018/0100612 | A1* | 4/2018 | Robison | F16L 37/0926 |

FOREIGN PATENT DOCUMENTS

| | | | | |
|---|---|---|---|---|
| DE | 102015224843 | A1 | 6/2017 | |
| EP | 0251929 | A1 | 1/1988 | |
| EP | 0875710 | A1 | 11/1998 | |
| EP | 1004807 | A1 | 5/2000 | |
| EP | 2112416 | A1 * | 10/2009 | F16L 37/0926 |
| EP | 2508783 | A1 * | 10/2012 | F16L 37/0926 |
| EP | 2508784 | A1 * | 10/2012 | F16L 37/0926 |
| WO | WO-2013115044 | A1 * | 8/2013 | F16L 33/227 |
| WO | 2015/132783 | A2 | 9/2015 | |
| WO | WO-2016041989 | A1 * | 3/2016 | F16L 37/091 |

* cited by examiner

INSTALLATION FITTINGS FOR USE IN DOMESTIC WATER SUPPLY PIPE SYSTEMS

FIELD OF THE INVENTION

The invention relates to installation fittings for use in domestic water supply pipe systems including inter alia hot and cold water systems, underfloor heating systems, and the like.

BACKGROUND OF THE INVENTION

Domestic water supply pipe systems employ installation fitting systems for joining plastic pipes having an external pipe gauge range from 16 mm to 110 mm. Some plastic pipes are mono-layer pipes. Some plastic pipes are multi-layer pipes. Some multi-layer plastic pipes include an aluminum core layer.

Domestic water supply pipe systems are required to meet one or more European Technical Standards ISO 21003, ISO 15874, ISO 22391, etc depending on their application class. Such technical standards specify inter alia a maximum temperature and a maximum pressure referred to hereinafter as "maximum application class parameters". The maximum application class parameters differ per application class as per following table:

|  | Application class | | | |
|---|---|---|---|---|
|  | Class 1 | Class 2 | Class 4 | Class 5 |
| Max. Temp. (° C.) | 80 | 80 | 70 | 90 |
| Max. Pressure (Bar) | 10 | 10 | 10 | 10 |

Presently commercially available installation fitting systems for domestic water pipe supply systems include inter alia compression fit installation fitting systems, press fit installation fitting systems, push fit installation fitting systems, and slide fit installation fitting systems. Compression fit installation fitting systems are also known as twist fit installation fitting systems and threaded fit installation fitting systems.

Installation fitting systems include a housing having at least one pipe end with a pipe tang for forced sliding mounting of a pipe thereon and an additional clamping mechanism assembled on the housing for clamping purposes. Some presently commercially available installation fittings are made wholly from metal. Suitable metals include inter alia brass, stainless steel SS304, and the like. Some presently commercially available installation fittings are made wholly from so-called engineering plastics. Suitable engineering plastics include inter alia PVDF, PPSU, PA6/6, and the like. Some presently commercially available installation fittings include a metal housing and additional engineering plastic clamping parts. Pipe tangs are typically fitted with at least one sealing ring and usually a spaced apart pair of sealing rings for all aforementioned plastic pipes for sealing purposes. Sealing rings are disposed in annular grooves thereby reducing local thickness of a pipe tang. Sealing rings can have different cross sections including inter alia O cross section, square cross section, and the like.

Commonly owned PCT International Application No. PCT/IL2015/050225 entitled Electromagnetic Induction Welding of Fluid Distribution Systems is published under PCT International Publication No. WO 2015/132783 A2 on Sep. 11, 2015. WO 2015/132783 A2 discloses an induction welding installation fitting system differing from the aforementioned installation fitting systems insofar as the former includes installation fittings having a housing only without an additional clamping mechanism. Rather induction welding installation fittings are intended to be deployed with induction weldable pipe connectors for in situ assembly. The induction welding installation fittings are also fitted with at least one sealing ring and usually a spaced apart pair of sealing rings for all aforementioned plastic pipes for sealing purposes similar to presently commercially available installation fittings.

WO 2015/132783 A2 page 11 line 3 to line 6 disclose the induction welding installation fittings can be made entirely from low end synthetic polymers such as thermoplastic material or thermosetting plastic which are considerably less expensive than the metal and/or engineering plastic materials employed for presently commercially available installation fittings. However, in order to meet required technical standards, the pipe tangs have a greater thickness compared to their metal or engineering plastic counterparts thereby leading to a reduction in a pipe tang's flow cross section. Such reduced flow cross section can in turn lead to an undesirable flow pattern though an installation fitting particularly at the lower end of the 16 mm to 110 mm external pipe gauge range.

There is a need for low cost installation fittings for use in domestic water supply pipe systems.

SUMMARY OF THE INVENTION

The present invention is directed toward installation fittings with at least one sealing ring and preferably a spaced apart pair of sealing rings in a conventional manner for use in domestic water supply pipe systems. The present invention is based on the notion the installation fittings have a composite structure including a housing manufactured from low end synthetic polymer material and having at least one pipe end with a pipe tang fitted with a tubular socket manufactured from high end material. Suitable high end materials include high end synthetic polymers or metals. The high end material sockets are intended to effectively act as protective barriers for the low end synthetic polymer material housings. Accordingly, the high end materials necessarily have higher yield strengths and lower longitudinal strain percentages at yield than the low end synthetic polymer materials at the required maximum application class parameters.

The present invention can be implemented for induction welding installation fittings thereby facilitating a reduction in a pipe tang's thickness compared to installation fittings having housings made entirely of low end synthetic polymer material thereby avoiding reduction in a pipe tang's flow cross section. The present invention can also be implemented for presently commercially available installation fittings including inter alia compression fit installation fittings, press fit installation fittings, push fit installation fittings, and slide fit installation fittings. The substitution of an installation fitting's housing material of either metal or engineering plastic by low end synthetic polymer material with each pipe tang being fitted with a high end material socket can lead to a significant cost reduction while still meeting required technical standards.

Sockets can be manufactured as discrete items for sliding insertion into pipe tangs. Alternatively, installation fittings can be manufactured as composite structures employing conventional manufacturing processes. The present invention can be implemented in a wide range of installation fittings including inter alia couplers, T fittings, Y fittings, X fittings, elbows, and the like, similar to presently commercially available installation fittings.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF DRAWINGS

Electromagnetic Induction Welding of Fluid Distribution Systems

Prior art FIG. 1 to FIG. 4 correspond to aforementioned commonly owned WO 2015/132783 A2's FIGS. 13, 14, 17 and 18.

Figure 1:
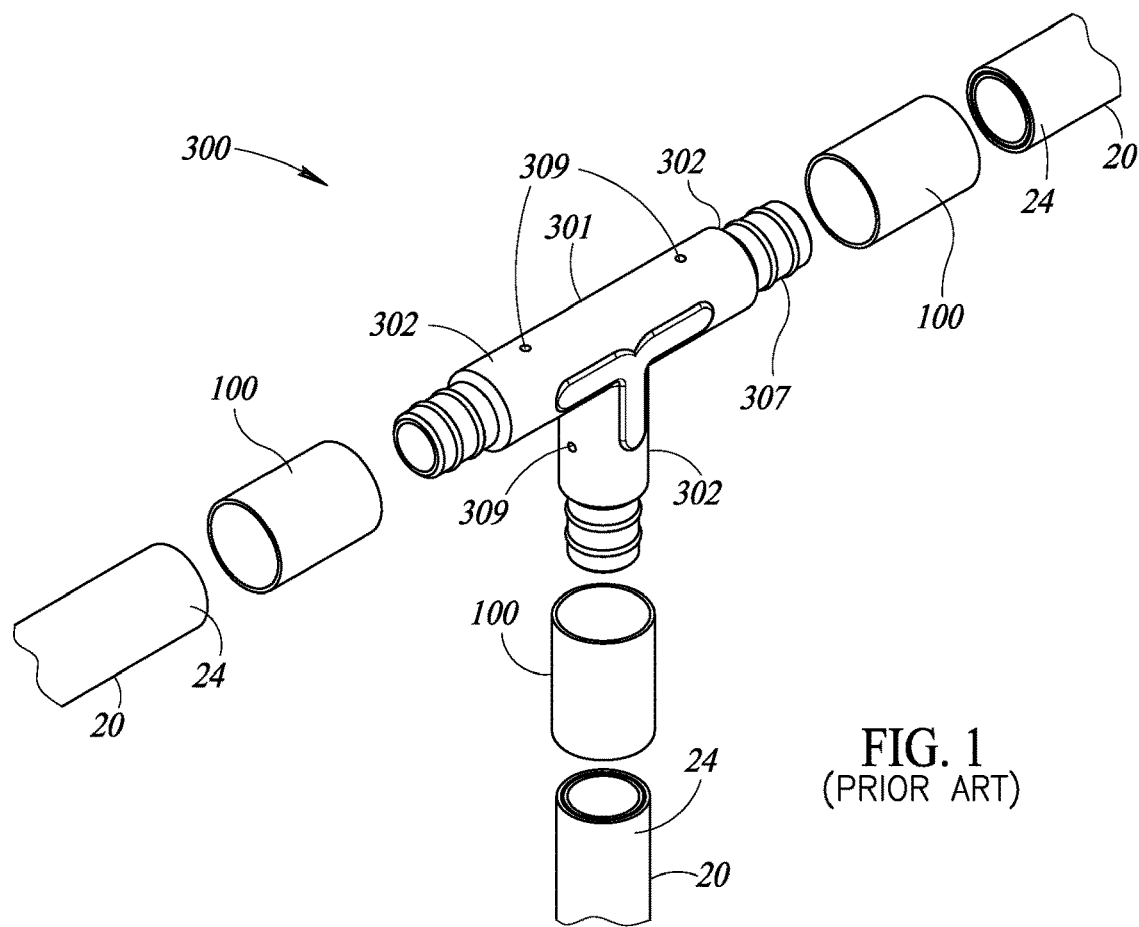
FIG. 1 corresponds to WO 2015/132783 A2's FIG. 13 showing a T-shaped induction welding installation fitting.
Figure 2:
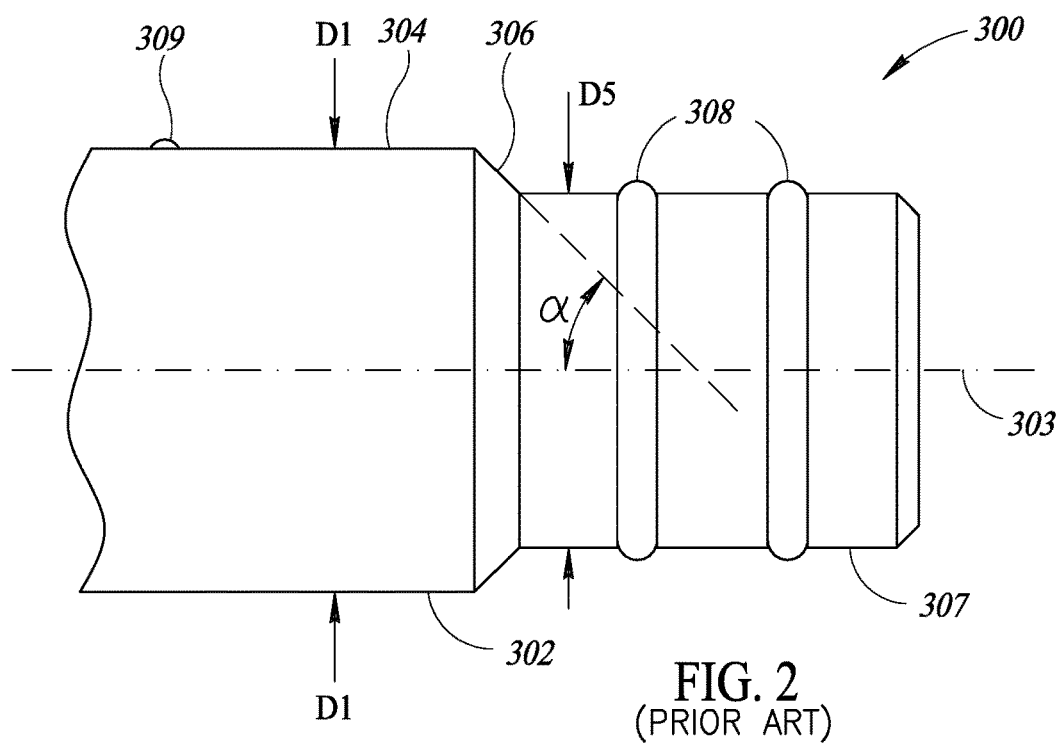
FIG. 2 corresponds to WO 2015/132783 A2's FIG. 14 showing a front elevation view of a pipe end of the T-shaped induction welding installation fitting.
Figure 3:
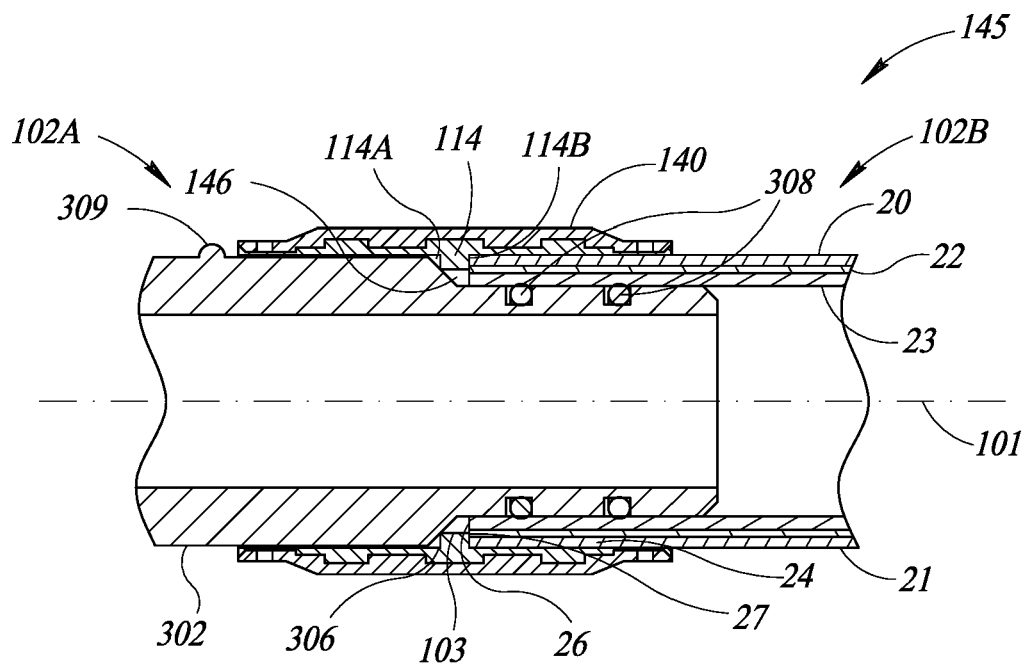
FIG. 3 corresponds to WO 2015/132783 A2's FIG. 17 showing a close-up view of a pre-welded joint of an assembled pipe end, an induction weldable pipe connector and a multi-layer pipe.

FIG. 1 shows a T-shaped installation fitting 300 for connecting three same diameter multi-layer pipes 20 including an aluminum core layer. FIG. 3 shows the multi-layer pipe 20 has a triple layer construction including an external plastic layer 21, an aluminum core layer 22 and an internal plastic layer 23. The multi-layer pipe 20 includes a pipe end 24 and an exposed annular pipe end face 26 with an annular aluminum core end face 27 which is prone to oxidation.

The T-shaped installation fitting 300 includes a housing 301 having three tubular plastic pipe ends 302. Each pipe end 302 has a pipe end centerline 303 and an exposed external peripheral plastic surface 304 co-directional with the pipe end centerline 303. Each pipe end 302 has a shoulder 306 converging to a tubular pipe tang 307 provided with a spaced apart pair of O rings 308 (see FIG. 2). The pipe end 302 preferably tapers to the pipe tang 307 such that the shoulder 306 subtends an included angle α with the pipe end centerline 303 within the range of 45°±10°. Each pipe end 302 includes a full insertion indicator 309 for providing a visual user indication that a pipe end 302 has been fully inserted into an injection weldable pipe connector when the full insertion indicator 309 is adjacent thereto.

FIG. 3 shows a pre-welded joint 145 of a pipe end 302, an induction weldable pipe connector 140 and a multi-layer pipe 20. The induction weldable pipe connector 140 has an induction weldable pipe socket 102A and an induction weldable pipe socket 102B. The induction weldable pipe connector 140 includes an inwardly directed stop 114 having a first abutment surface 114A facing the induction weldable pipe socket 102A and a second abutment surface 114B facing the induction weldable pipe socket 102B.

FIG. 3 shows the pipe end 302 is inserted into the induction weldable pipe socket 102A until abutment of its shoulder 306 against the first annular abutment surface 114A. The multi-layer pipe 20 is inserted into the induction weldable pipe socket 102B until abutment against the second annular abutment surface 114B. Sliding insertion of the pipe end 302 and the multi-layer pipe 20 into the induction weldable pipe connector 140 sealingly slides the pipe tang 307 into the multi-layer pipe 20 by virtue of the O-rings 308 sealingly engaging the multi-layer pipe's internal plastic layer 23. The pre-welded joint 145 includes a circular cavity 146 bound by the shoulder 306, the induction weldable pipe connector 140's internal thermoplastic solder lining 103 and the multi-layer pipe's exposed annular pipe end surface 26.

Figure 4:
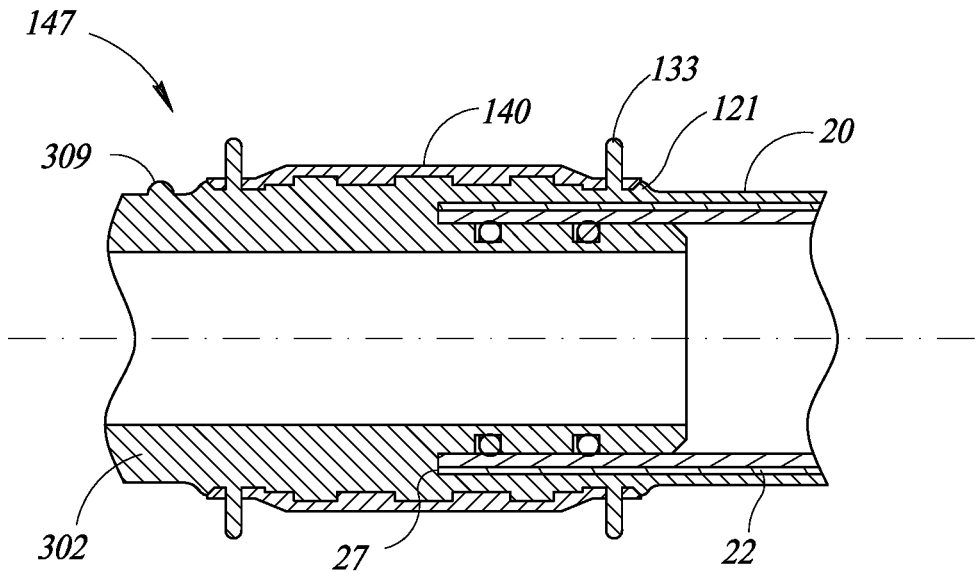
FIG. 4 corresponds to WO 2015/132783 A2's FIG. 18 showing a close-up view of a welded sealed joint of an assembled pipe end, an induction weldable pipe connector and a multi-layer pipe.

FIG. 4 shows a welded sealed joint 147 subsequent to application of induction energy to the pre-welded joint 145. The internal thermoplastic solder lining 103 melts to form annular plastic extrusion 121 and outward radial protrusions 133. The internal thermoplastic solder lining 103 also melts and flows radially inwards towards the pipe tang 307 to fill the circular cavity 146 for sealing the multi-layer pipe's annular aluminum core end surface 27. Such sealing provides additional protection against oxidation of the aluminum core layer 22.

Installation Fittings Including a Housing Having a Pipe Tang with a Socket

The installation fittings include a housing with at least one pipe end with a pipe tang. The installation fittings can be of any one of the following installation fitting technologies: induction weldable installation fittings as described hereinabove described; compression fit installation fittings (see FIG. 12 to FIG. 17), press fit installation fittings (see FIG. 18 to FIG. 23), slide fit installation fittings (see FIG. 24 to FIG. 29) and push fit installation fittings (see FIG. 30 to FIG. 34).

Figure 5:
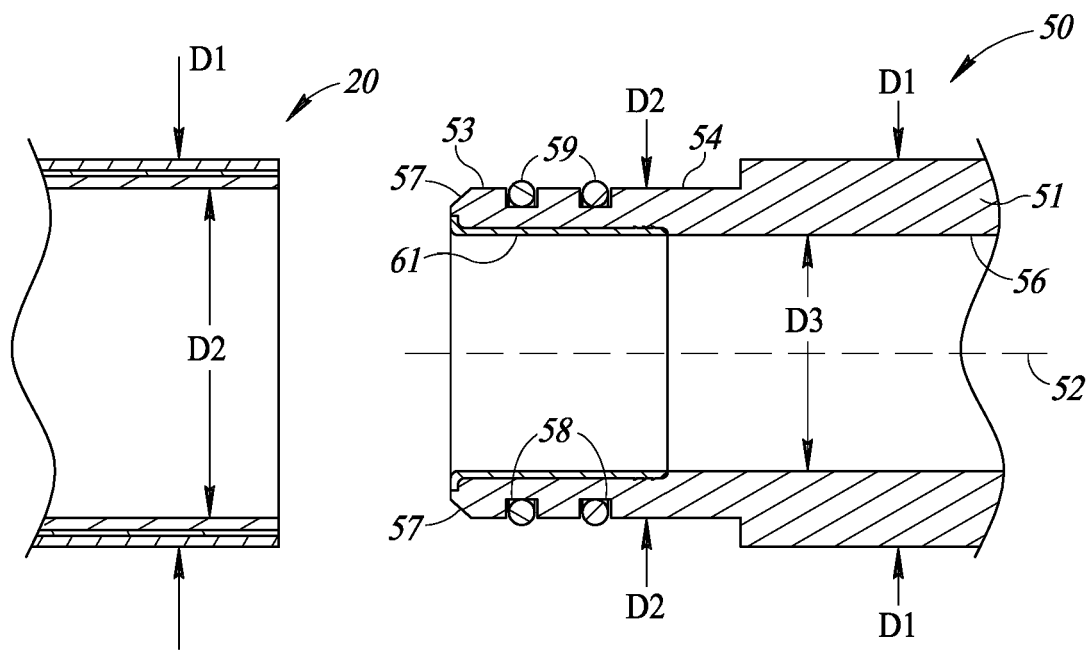
FIG. 5 is a longitudinal cross section showing a pipe tang with a socket for use with a multi-layer pipe.
Figure 6:
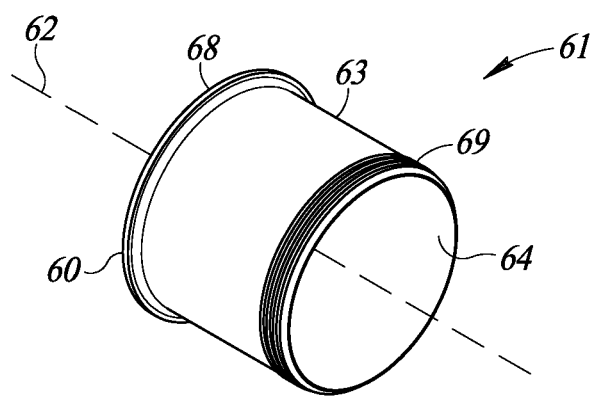
FIG. 6 is a front perspective view of the FIG. 5 socket.
Figure 7:
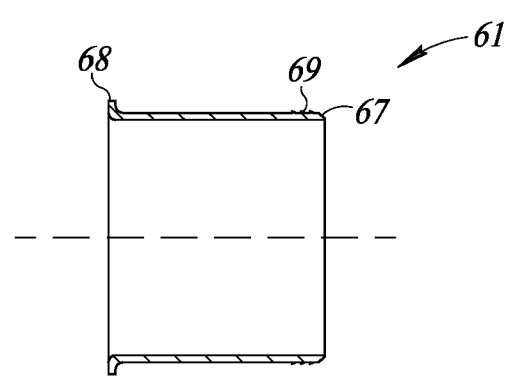
FIG. 7 is a longitudinal cross section of the FIG. 5 socket.

FIG. 5 to FIG. 7 show a housing 50 having a tubular pipe end 51 having a pipe end centerline 52 and a pipe tang 53 for use with a multi-layer pipe 20. The multi-layer pipe 20 has an external pipe diameter D1 and an internal pipe diameter D2 wherein D1>D2. The housing 50 is made of low end synthetic polymer, for example, thermoplastic polyolefins.

The pipe tang 53 has an external peripheral pipe tang surface 54, an internal peripheral pipe tang surface 56 and an annular pipe tang end surface 57. The pipe tang 53 has a spaced apart pair of annular grooves 58 fitted with sealing rings 59. The pipe end 51 has the same external pipe diameter D1 as the multi-layer pipe 20. The pipe tang 53 has an external pipe tang diameter D2 the same as the multi-layer pipe's internal pipe diameter D2. The pipe end 51 and the pipe tang 53 has an internal pipe diameter D3 wherein D2>D3.

The pipe tang 53 is fitted with a tubular socket 61 having a longitudinal socket centerline 62 co-axial with the pipe end centerline 52. The socket 61 is made of high end material, for example, PPSU. The socket 61 includes an external peripheral socket surface 63, an internal peripheral socket surface 64, a leading annular socket end surface 66 and a trailing annular socket end surface 67. The socket 61 includes a leading annular socket flange 68 constituting the leading annular socket end surface 66. The external peripheral socket surface 63 includes at least one engagement feature 69 towards the trailing annular socket end surface 67. Suitable engagement features 69 include inter alia annular teeth and the like.

The socket 61 is disposed inside the pipe tang 53 such that the socket 61 lines the internal peripheral pipe tang surface 56, the leading annular socket flange 68 is flush against the annular pipe tang end surface 57 and the trailing annular socket end surface 67 is remote from the annular pipe tang end surface 57. The socket 61 underlies the spaced apart pair of annular grooves 58 and therefore the sealing rings 59. The leading annular socket flange 68 covers at least an inner rim of the annular pipe tang end surface 57. The engagement features 69 mechanically engage the internal peripheral pipe tang surface 56.

Figure 8:
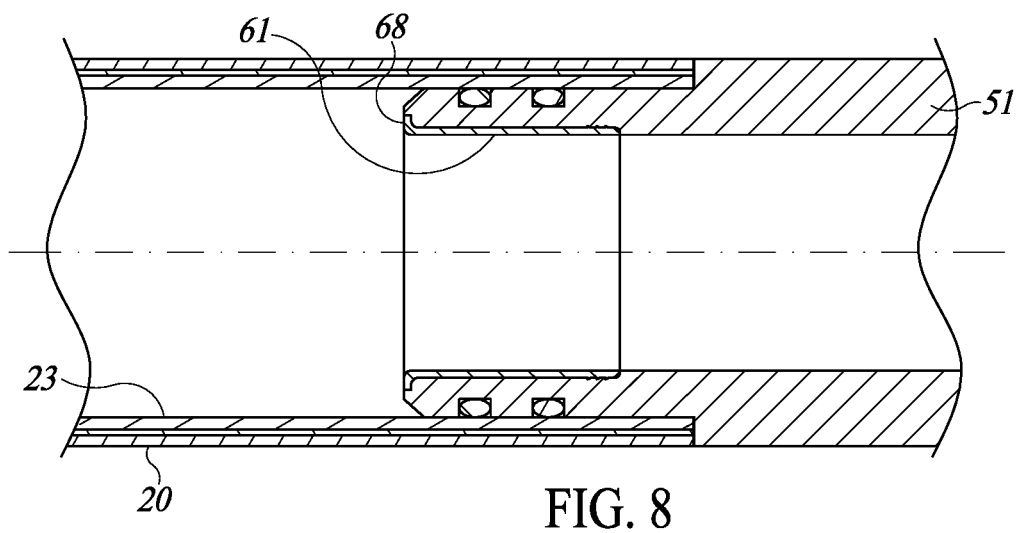
FIG. 8 is a longitudinal cross section of the FIG. 5's pipe tang pursuant to forced sliding mounting of the multi-layer pipe thereon.

FIG. 8 shows the multi-layer pipe 20 slidingly mounted on the pipe tang 53 for compressing the sealing rings 59 which sealingly contact the multi-layer pipe's internal plastic layer 23.

Figure 9:
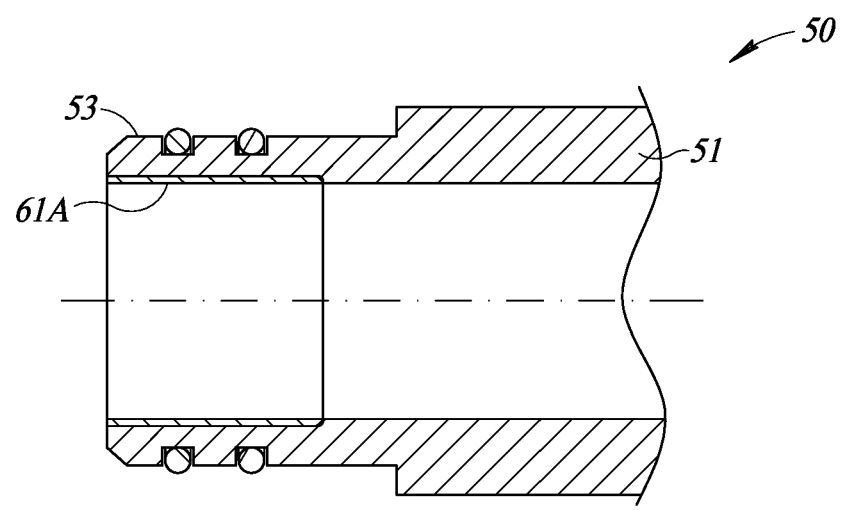
FIG. 9 is a longitudinal cross section showing a pipe tang with another socket for use with a multi-layer pipe.
Figures 10, 11:
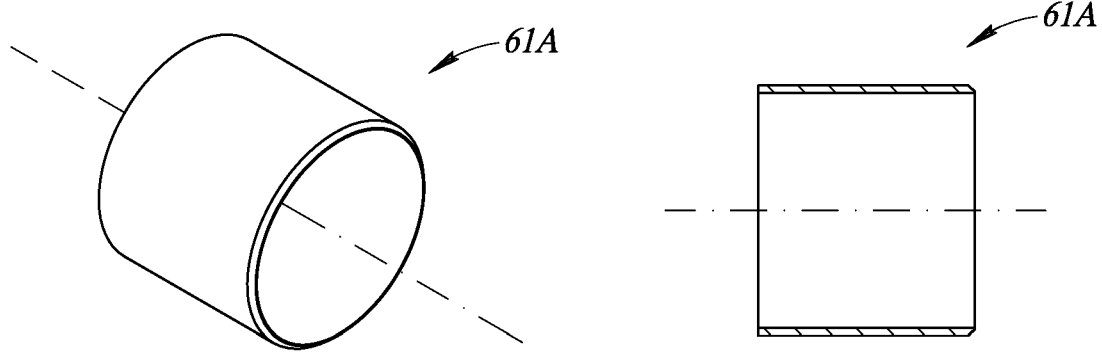
FIG. 10 is a front perspective view of the FIG. 9 socket.
FIG. 11 is a longitudinal cross section of the FIG. 9 socket.
Figure 12:
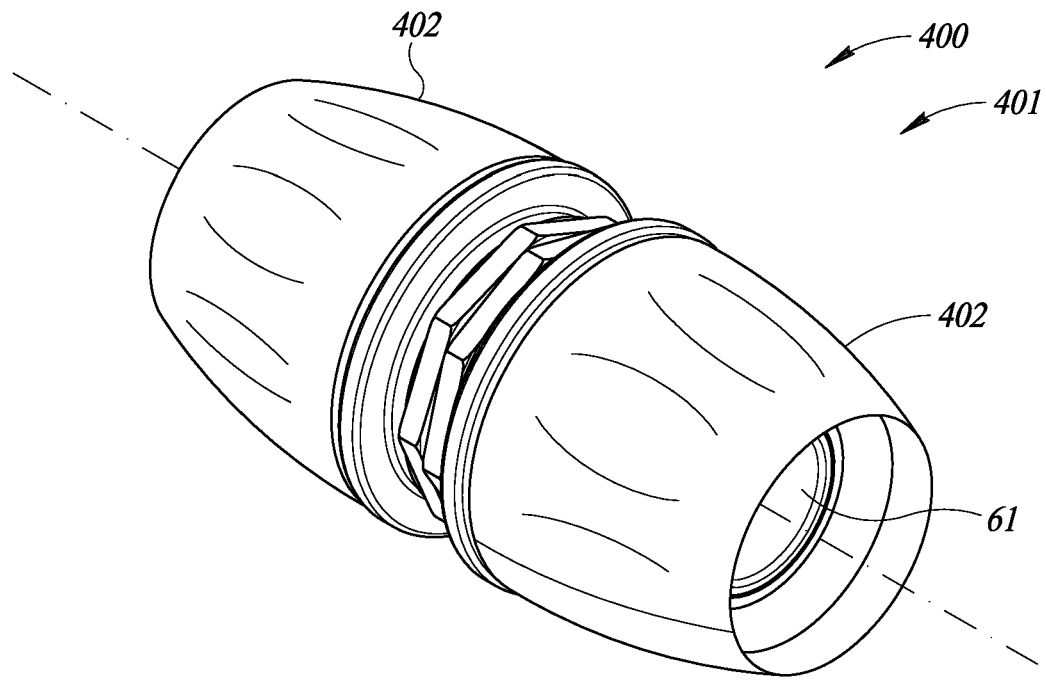
FIG. 12 is a front perspective view of a compression fit installation fitting according to the present invention.
Figure 13:
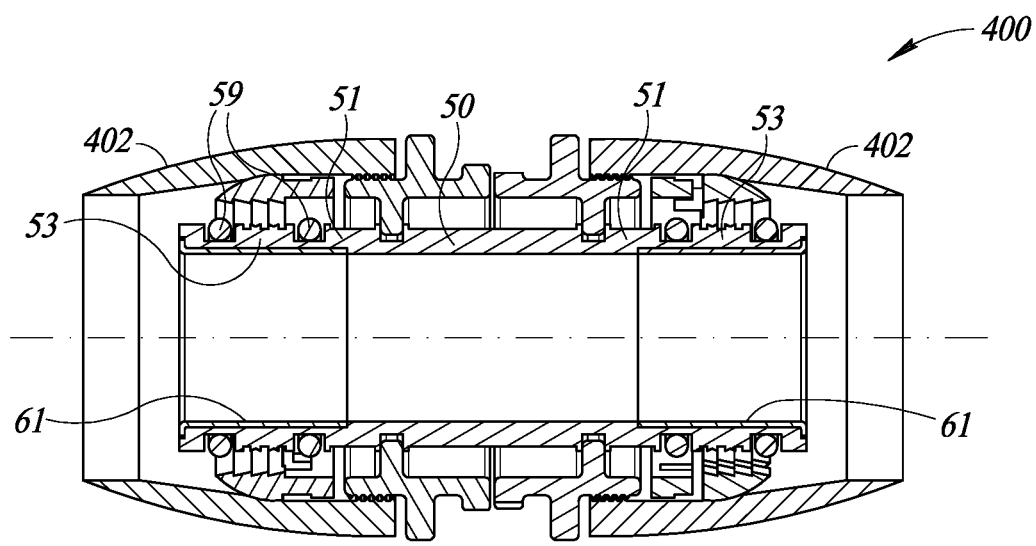
FIG. 13 is a longitudinal cross section view of FIG. 12's compression fit installation fitting.
Figure 14:
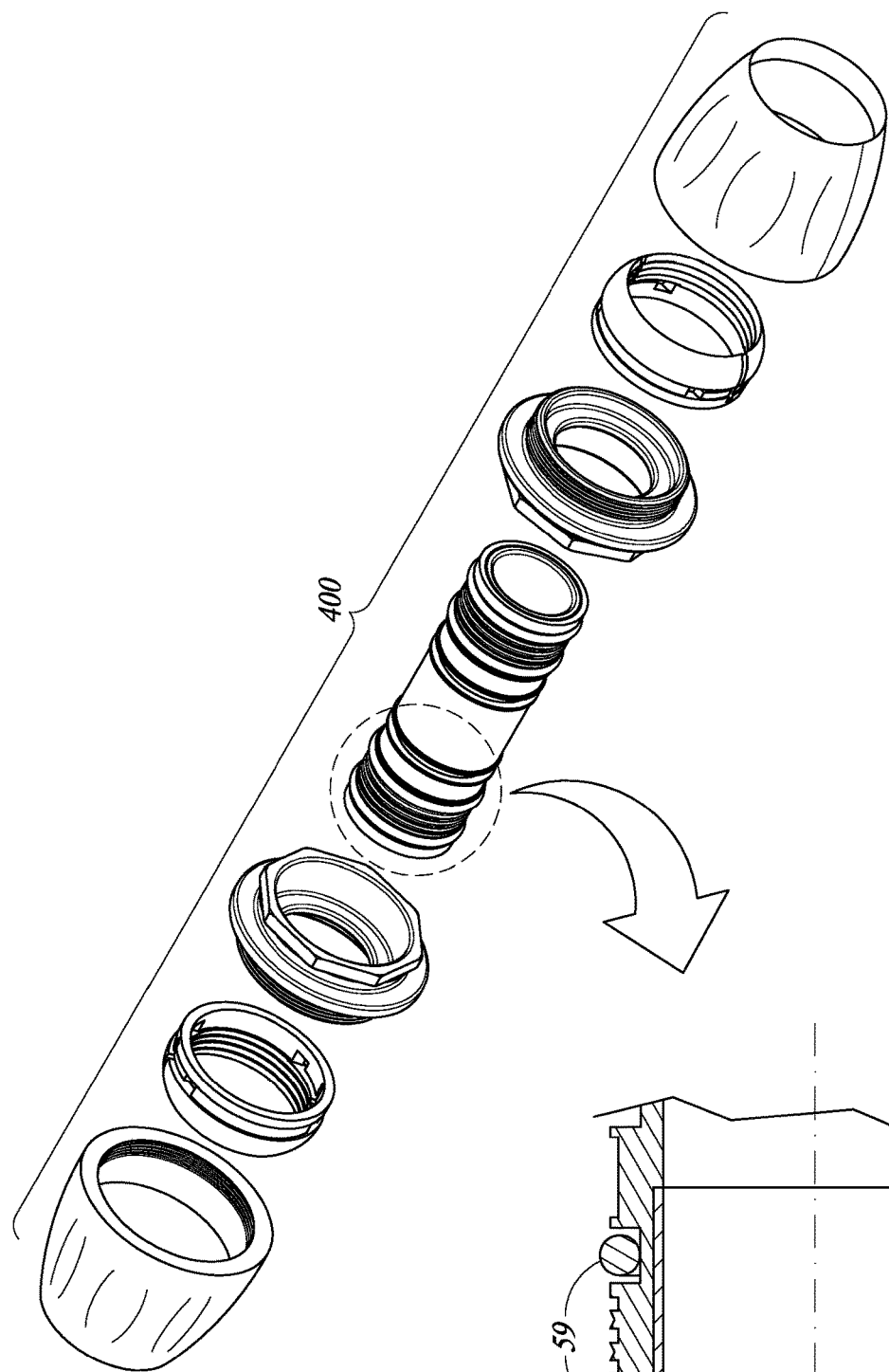
FIG. 14 is an exploded view of FIG. 12's compression fit installation fitting.
Figure 15:
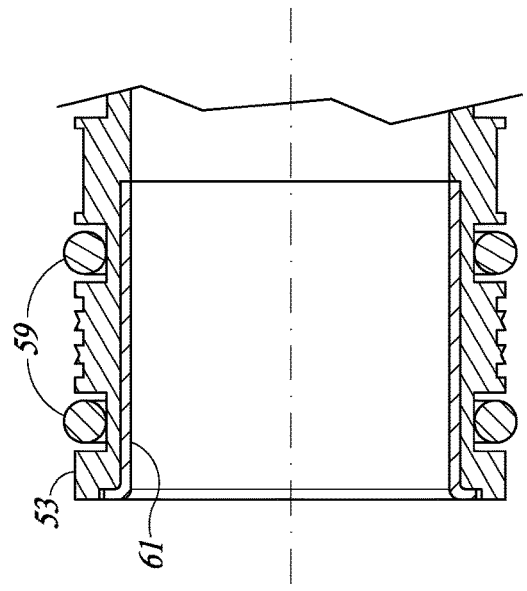
FIG. 15 is an enlarged view of a pipe tang of FIG. 12's compression fit installation fitting.
Figure 16:
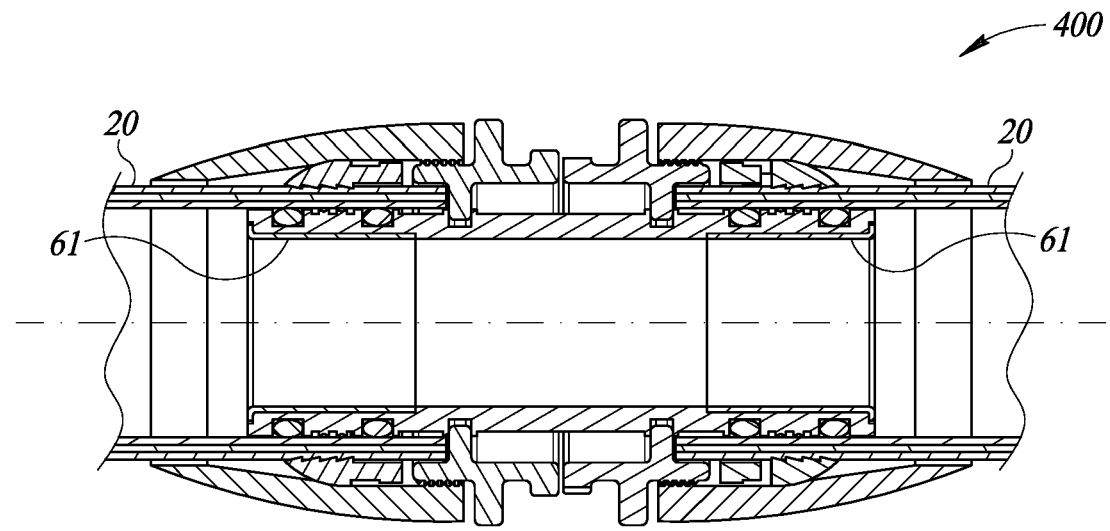
FIG. 16 is a longitudinal cross section of FIG. 12's compression fit installation fitting prior to manual action to seal a pipe inserted therein.
Figure 17:
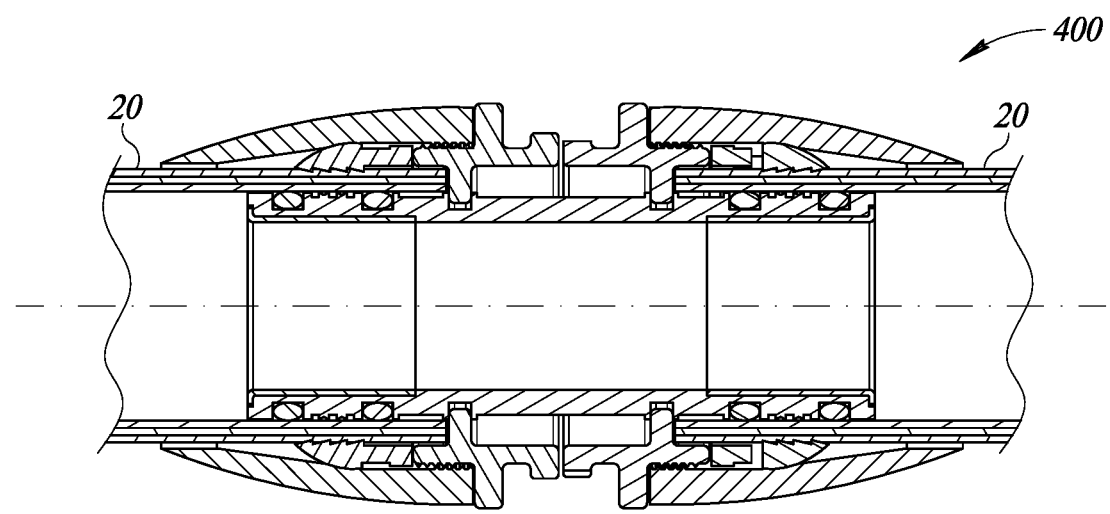
FIG. 17 is a longitudinal cross section of FIG. 12's compression fit installation fitting pursuant to manual action to seal the pipe inserted therein.
Figure 18:
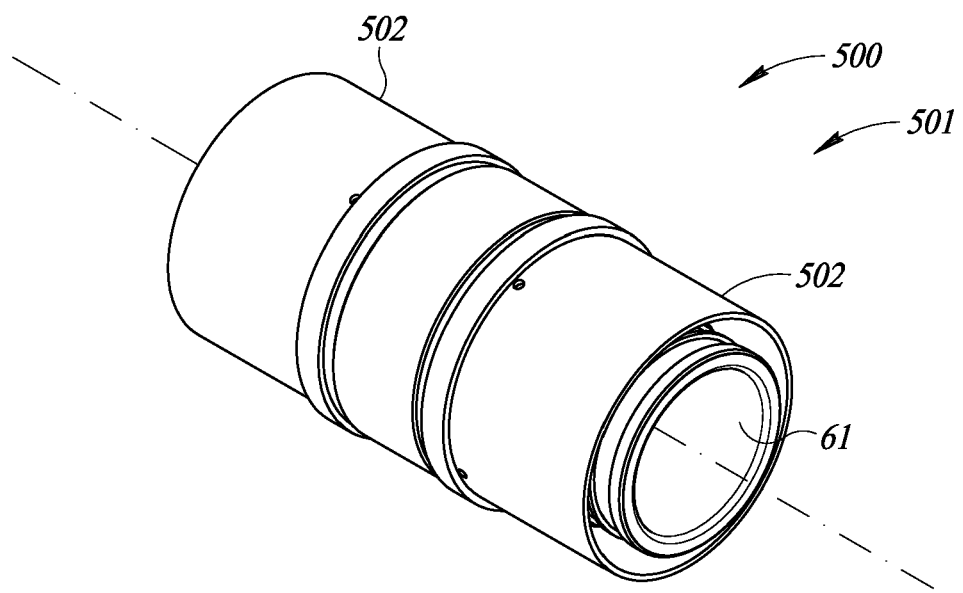
FIG. 18 is a front perspective view of a press fit installation fitting according to the present invention.
Figure 19:
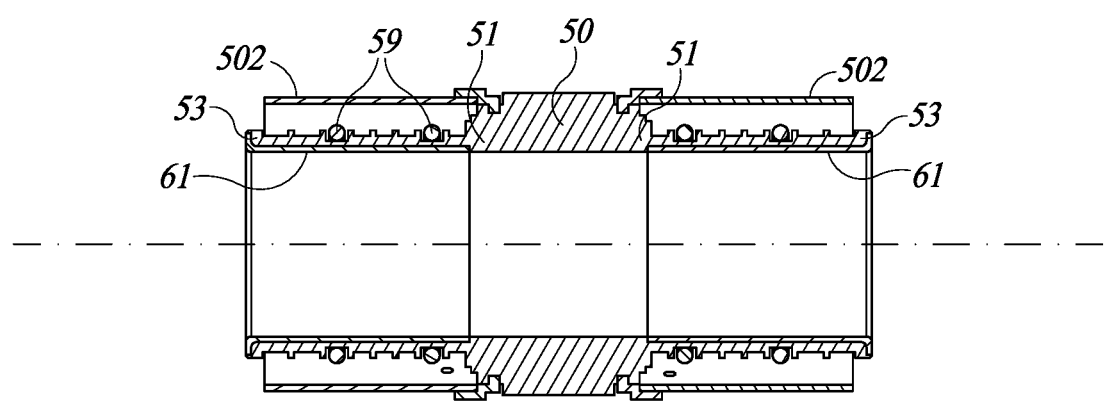
FIG. 19 is a longitudinal cross section view of FIG. 18's press fit installation fitting.
Figure 20:
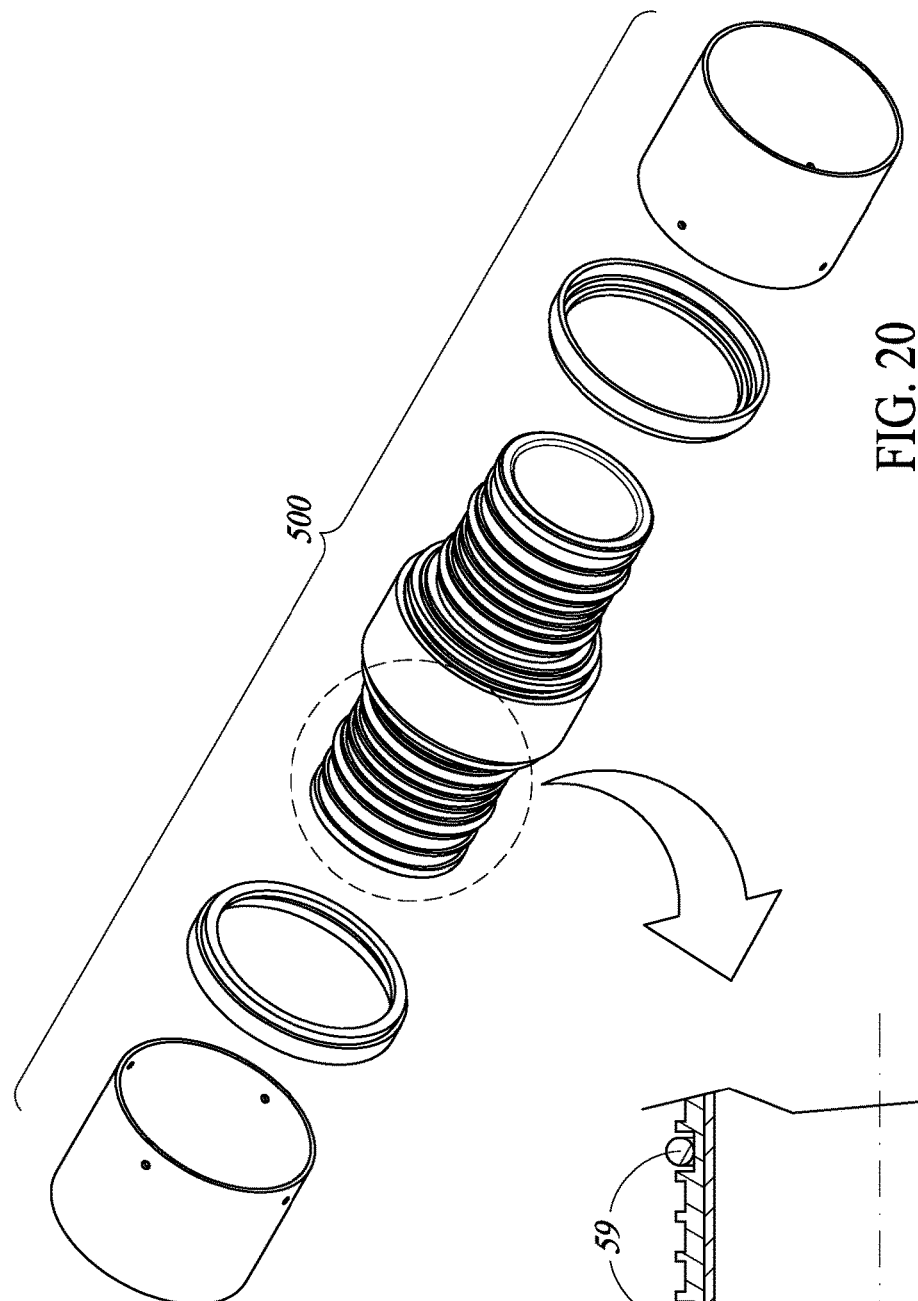
FIG. 20 is an exploded view of FIG. 18's press fit installation fitting.
Figure 21:
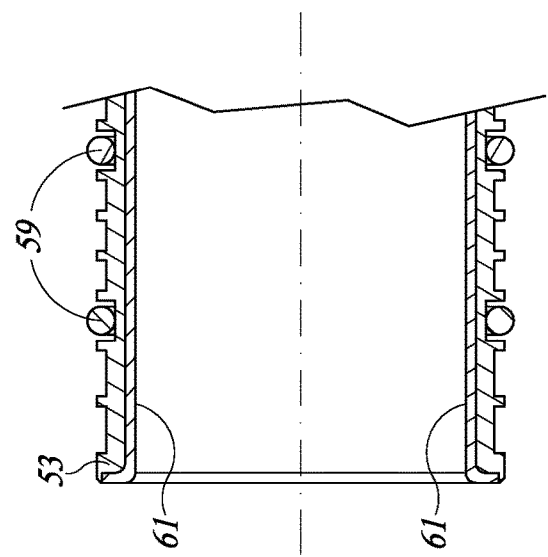
FIG. 21 is an enlarged view of a pipe tang of FIG. 18's press fit installation fitting.
Figure 22:
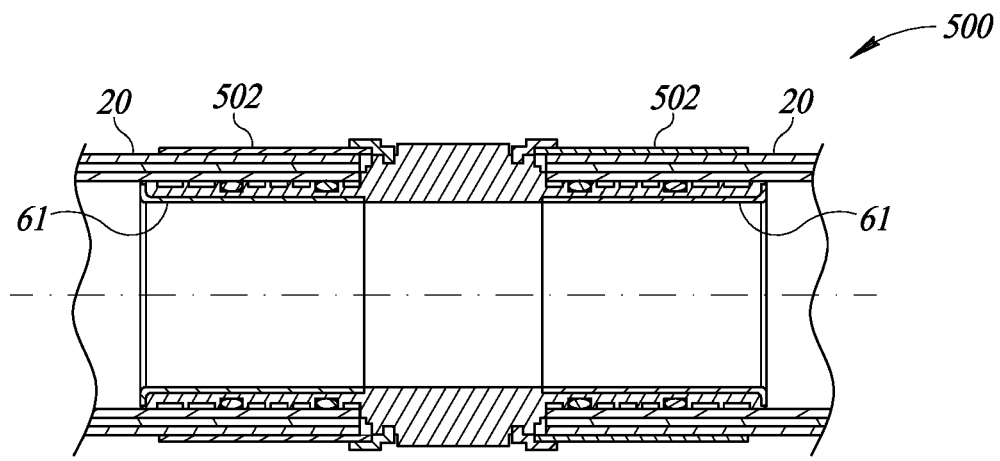
FIG. 22 is a longitudinal cross section of FIG. 18's press fit installation fitting prior to manual action to seal a pipe inserted therein.
Figure 23:
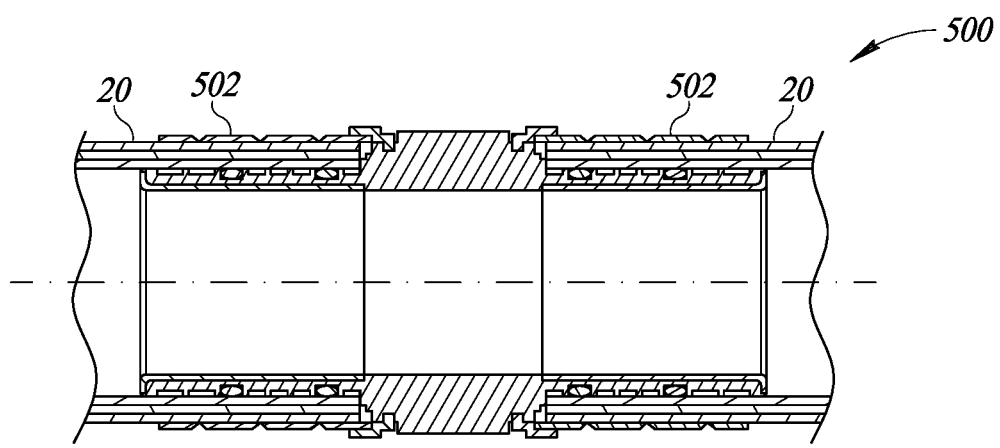
FIG. 23 is a longitudinal cross section of FIG. 18's press fit installation fitting pursuant to manual action to seal the pipe inserted therein.
Figure 24:
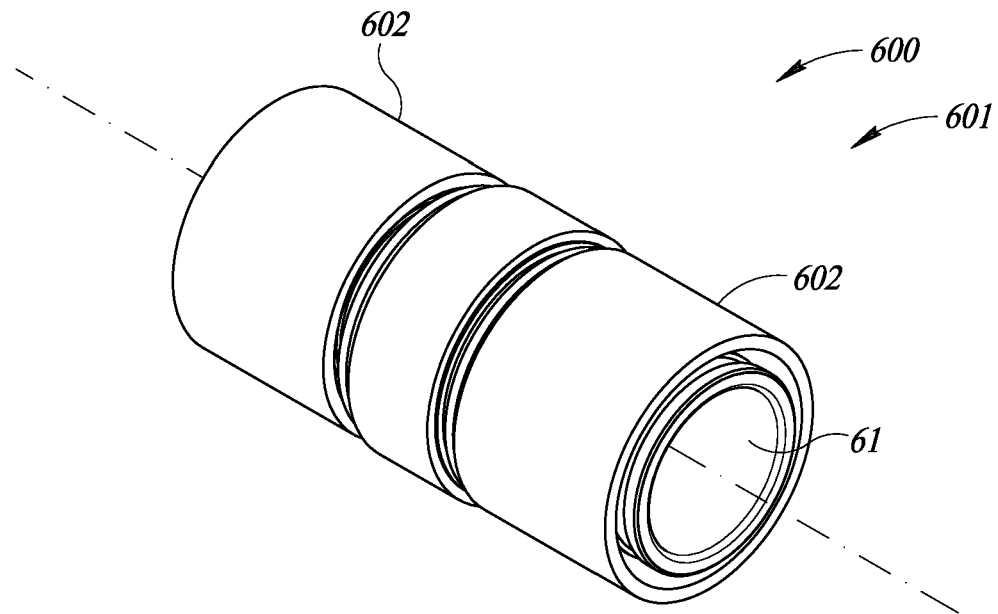
FIG. 24 is a front perspective view of a slide fit installation fitting according to the present invention.
Figure 25:
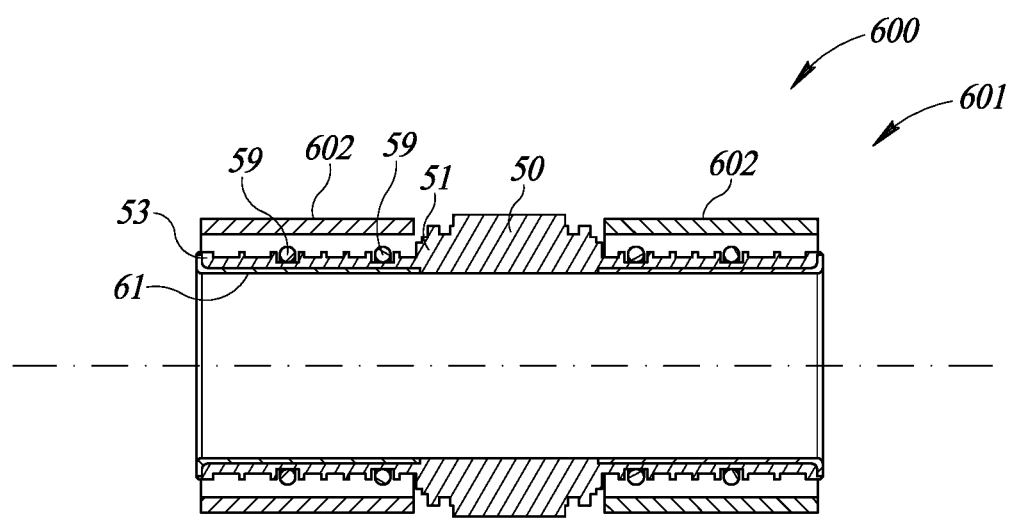
FIG. 25 is a longitudinal cross section view of FIG. 24's slide fit installation fitting.
Figure 26:
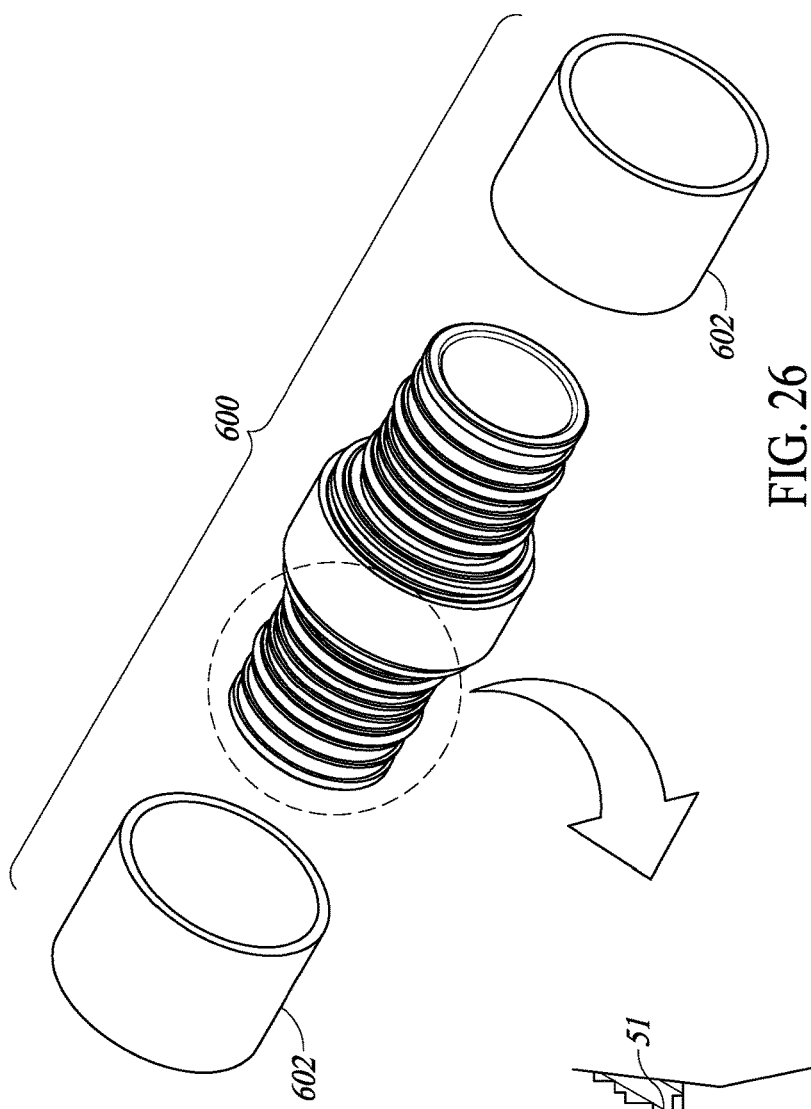
FIG. 26 is an exploded view of FIG. 24's slide fit installation fitting.
Figure 27:
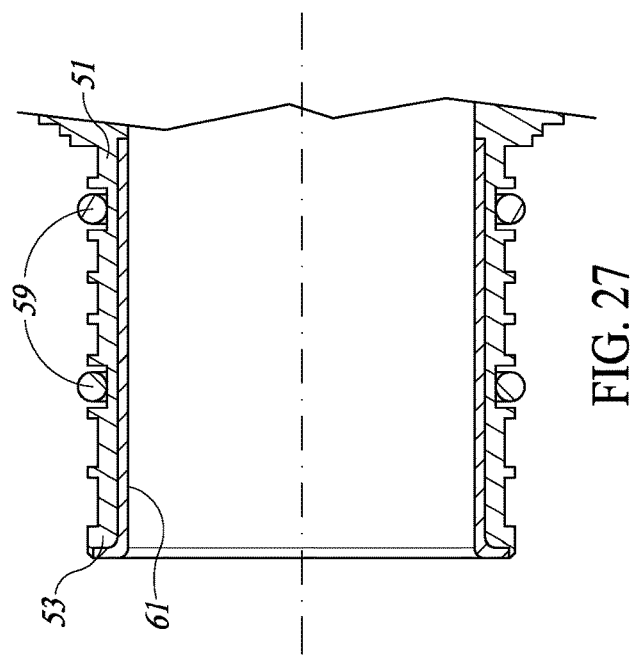
FIG. 27 is an enlarged view of a pipe tang of FIG. 24's slide fit installation fitting.
Figure 28:
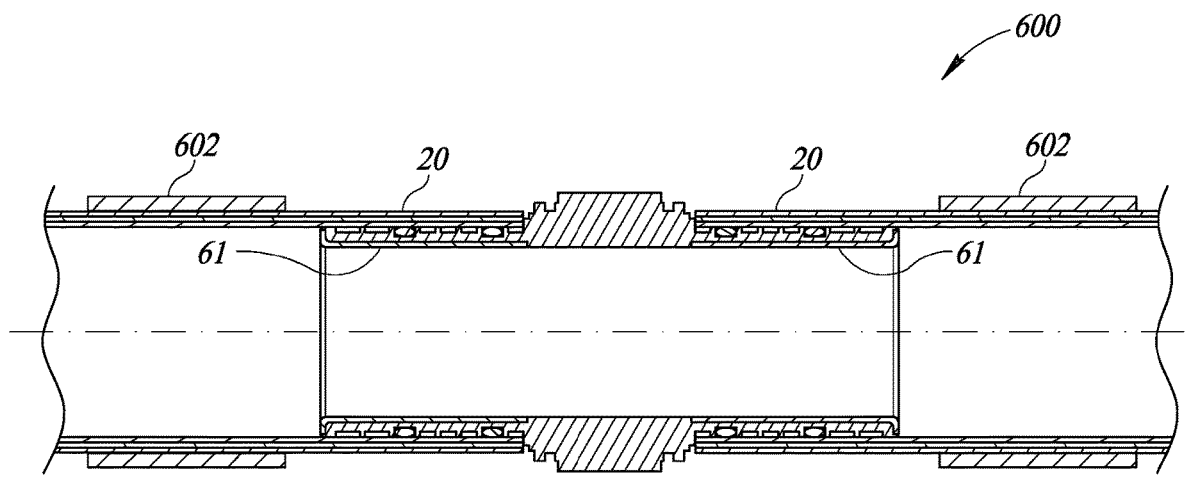
FIG. 28 is a longitudinal cross section of FIG. 24's slide fit installation fitting prior to manual action to seal a pipe inserted therein.
Figure 29:
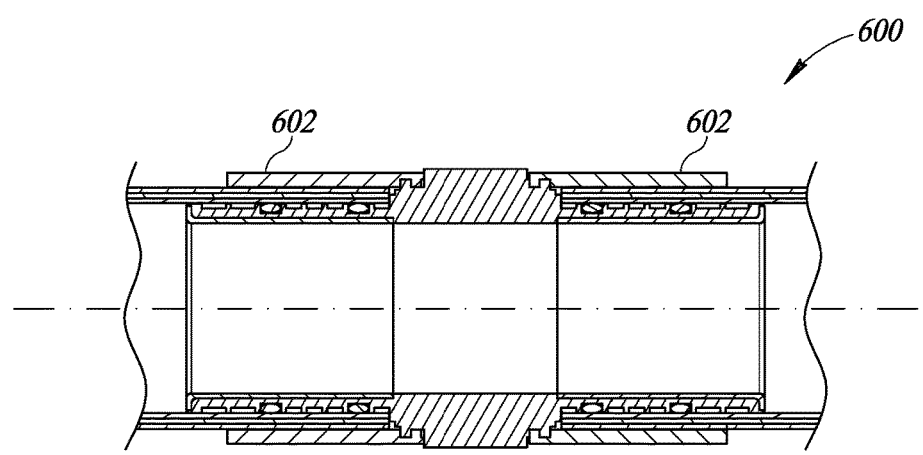
FIG. 29 is a longitudinal cross section of FIG. 24's slide fit installation fitting pursuant to manual action to seal the pipe inserted therein.
Figure 30:
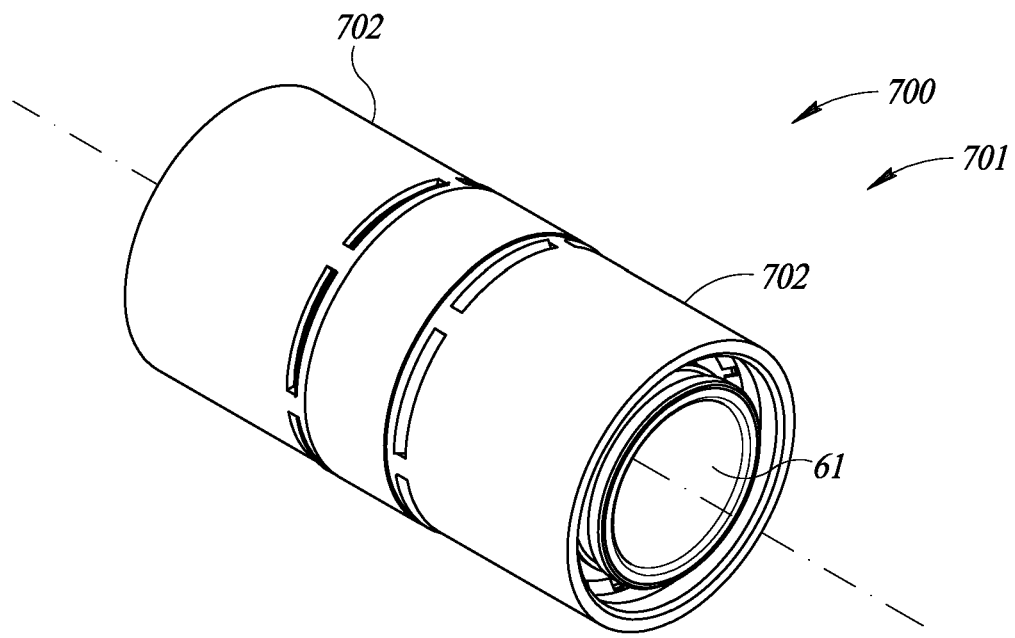
FIG. 30 is a front perspective view of a push fit installation fitting according to the present invention.
Figure 31:
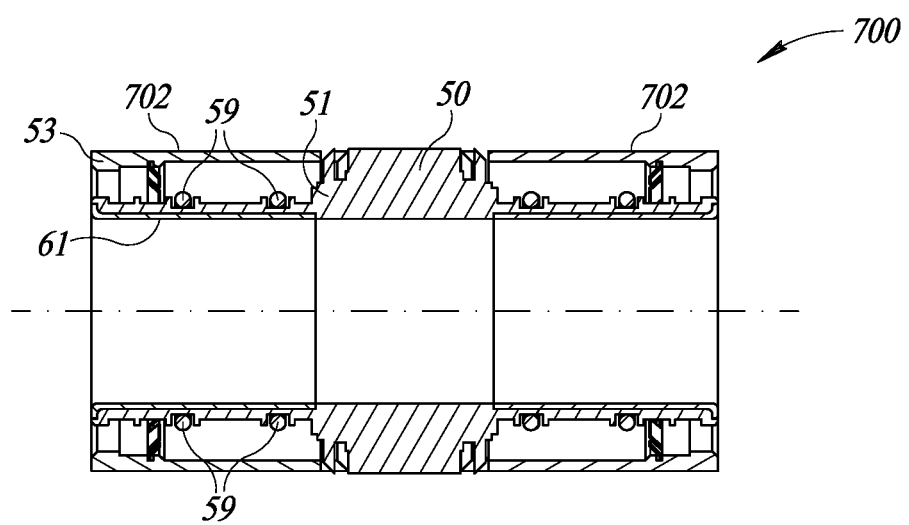
FIG. 31 is a longitudinal cross section view of FIG. 30's push fit installation fitting.
Figure 32:
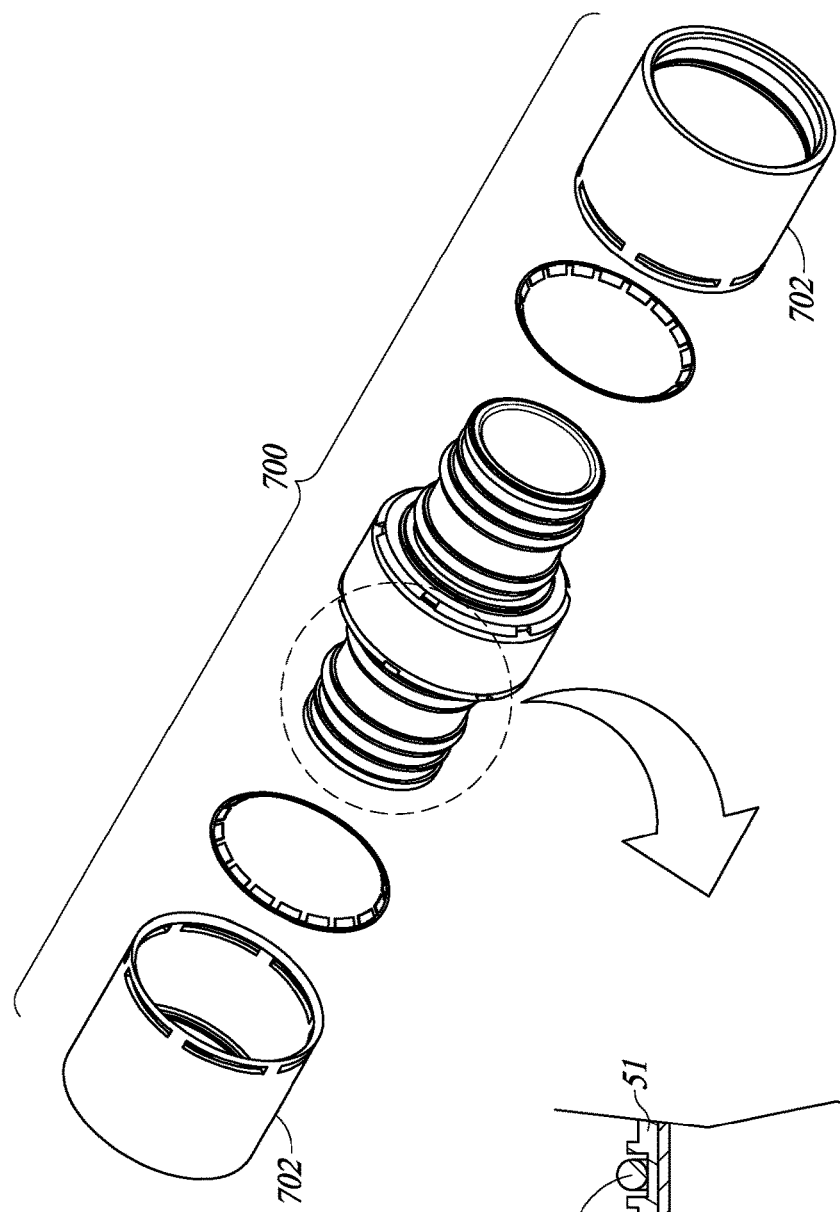
FIG. 32 is an exploded view of FIG. 30's push fit installation fitting.
Figure 33:
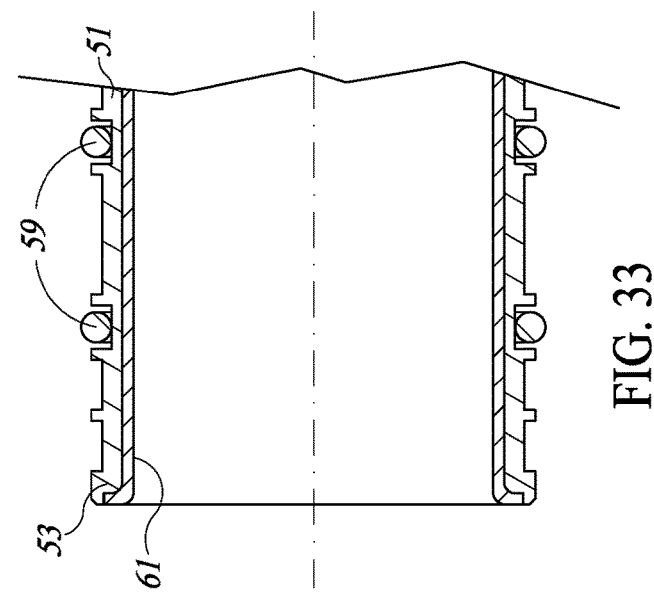
FIG. 33 is an enlarged view of a pipe tang of FIG. 30's push fit installation fitting.
Figure 34:
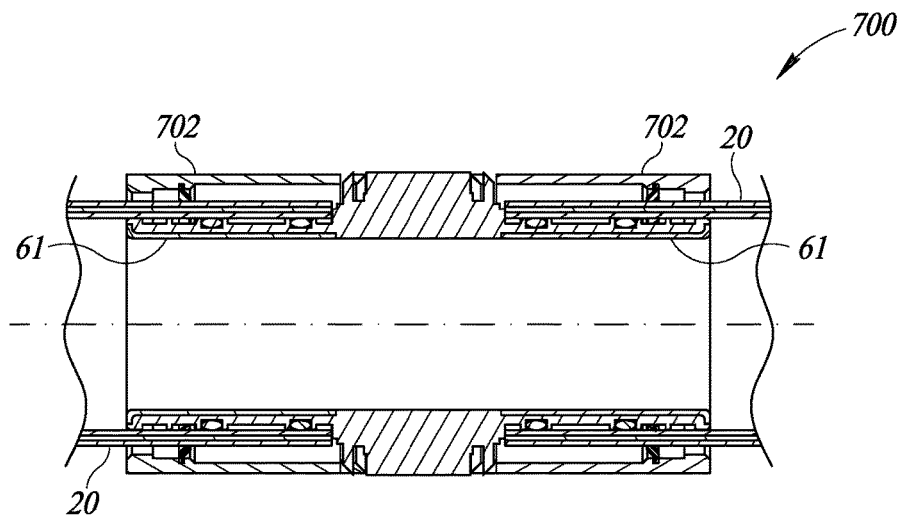
FIG. 34 is a longitudinal cross section of FIG. 30's push fit installation fitting pursuant to manual action to seal a pipe inserted therein.

FIG. 9 to FIG. 11 show the pipe tang 53 fitted with an alternative tubular socket 61A without an annular socket flange or engagement features.

Sockets can be made as a discrete component for subsequent assembly in installation fittings. Alternatively, installation fittings can be manufactured with integral sockets. Suitable conventional manufacturing processes include overmolding, dual molding, and the like.

Presently Commercially Available Installation Fitting Systems

The present invention can also be readily implemented for presently commercially available installation fittings including inter alia compression fit installation fittings, press fit installation fittings, push fit installation fittings, and slide fit installation fittings. The construction and operation of the aforesaid installation fittings are well known in the art and therefore accordingly only briefly described hereinbelow for sake of conciseness. The aforesaid installation fittings have a common component with the above described injection welding installation fitting, namely, a housing 50 with at least one tubular pipe end 51 terminating in a pipe tang 53. The aforesaid installation fittings differ from the above described injection welding installation fitting and from each other in terms of an additional clamping mechanism. Implementation of the present invention involves substitution of an installation fitting's housing material of either metal or engineering plastic by low end synthetic polymer material with each pipe tang being fitted with a high end material pipe tang socket.

FIG. 12 to FIG. 17 show a compression fit installation fitting 400 including a housing 50 having an opposite pair of pipe ends 51 each terminating at a pipe tang 53. Each pipe tang 53 includes a spaced apart pair of sealing rings 59 and a socket 61. The compression fit installation fitting 400 includes a clamping mechanism 401 having manually rotatable nuts 402 for actuating the clamping mechanism into a clamping positions for clamping two pipes.

Companies manufacturing compression fit installation fittings include inter alia 1) Wavin Holding B.V. Stationsplein 3, 8000 AD, Zwolle, The Netherlands www.wavin.com
2) Uponor Corporation, Ayritie 20, 01510 Vantaa, Finland www.uponor.com
3) Industrial Blansol, S.A. Poligono Industrial, Ambrosero, parcela 19, 39791 Barcena de Cicero, Spain www.blansol.com FIG. 18 to FIG. 23 show a press fit installation fitting 500 including a housing 50 having an opposite pair of pipe ends 51 each terminating at a pipe tang 53. Each pipe tang 53 includes a spaced apart pair of sealing rings 59 and a socket 61. The press fit installation fitting 500 includes a clamping mechanism 501 having deformable sleeves 502 for being deformed into a clamping positions for clamping two pipes 20.

Companies manufacturing press fit installation fittings include inter alia
1) Above mentioned Wavin
2) Frankische Rohrwerke, Gebr. Kirchner GmbH & Co. KF, Hellinger Str. 1, 97486 Konigsberg Bayern, Germany www.fraenkische.com
3) N.T.M. s.p/a/Via John Maynard Keynes, 15/17-25030 Brandico, Italy www.ntmspa.com FIG. 24 to FIG. 29 show a slide fit installation fitting 600 including a housing 50 having an opposite pair of pipe ends 51 each terminating at a pipe tang 53. Each pipe tang 53 includes a spaced apart pair of sealing rings 59 and a socket 61. The slide fit installation fitting 600 includes a clamping mechanism 601 having sleeves 602 for being urged into a clamping positions for clamping two pipes 20. The sleeves 602 are initially provided on the housing 50. For installation purposes, the sleeves 602 are slid off from the housing 50 and slid onto pipes 20. Then, the pipes 20 are slid onto the pipe tangs 53 (see FIG. 28) and the sleeves 602 are slid towards the housing 50 for clamping the pipes 20.

Companies manufacturing slide fit installation fittings include inter alia
1) Rehau Rheniumhaus, otto-Hahn-Strabe 2, 95111 Regau, Germany www.rehau.com
2) KAN Sp. z.o.o ul. Zdrojowa 51, 16-001 Biatystok-Kleosin, Poland www.kan-therm.com
3) Comap a.s. U Uranie 1612/14a 170 00 Prague 7 Czech Republic www.comap-control.com
4) Georg Fischer JRG AG, Hauptstrasse 130, CH-4450 Sissach/Switzerland www.georgfischer.com FIG. 30 to FIG. 34 show a push fit installation fitting 700 including a housing 50 having an opposite pair of pipe ends 51 each terminating at a pipe tang 53. Each pipe tang 53 includes a spaced apart pair of sealing rings 59 and a socket 61. The push fit installation fitting 700 includes a clamping mechanism 701 having sleeves 702 for slidingly receiving two pipes 20 for clamping same.

Figure 35:
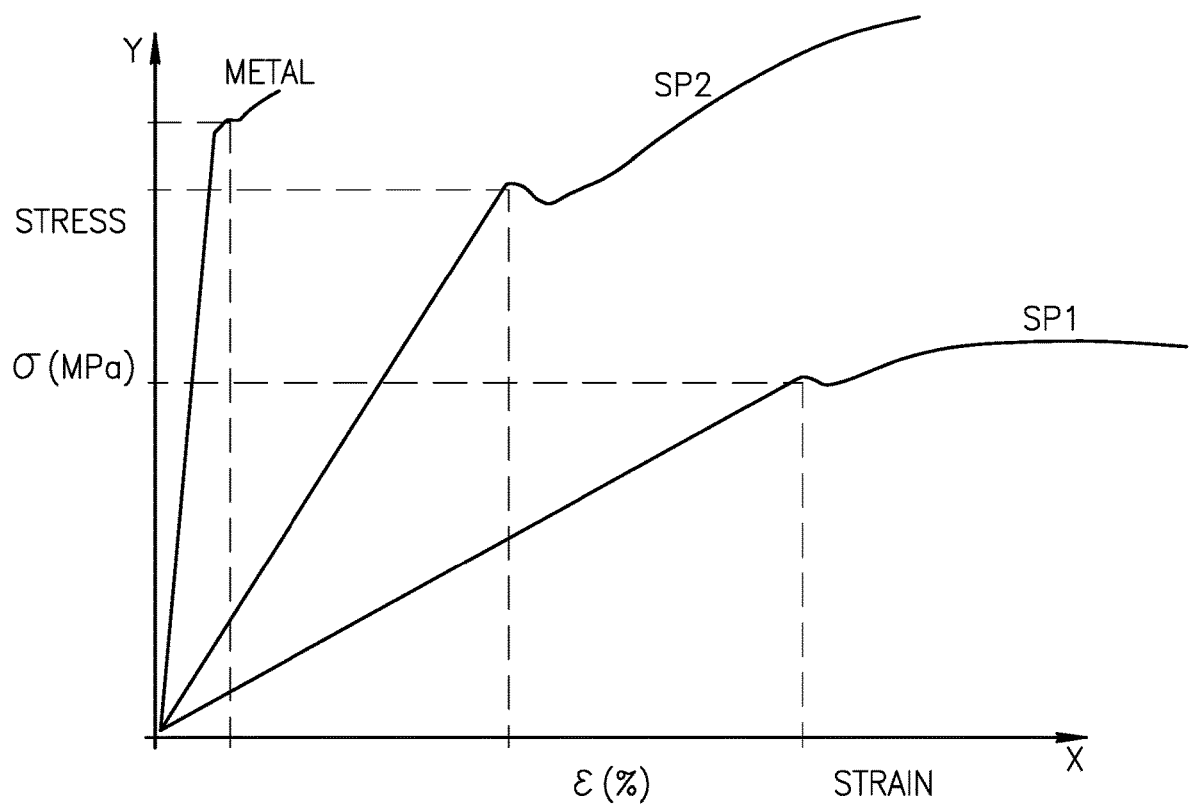
FIG. 35 shows qualitative stress-strain curves of an exemplary low end synthetic polymer material, an exemplary high end synthetic polymer material and an exemplary metal suitable for installation fittings in accordance with the present invention.

Companies manufacturing push fit installation fittings include inter alia
1) Tece GmbH, Hollefeldst. 57, 48282 Emsdetten, Germany www.tece.com
2) Geberit international AG, Schachenstrasse 77, CH-8645 Jona, Switzerland www.geberit.com
3) Above mentioned Uponor Selection of Materials The selection of materials is divided between low end synthetic polymer materials for housings and high end materials for sockets. FIG. 35 shows qualitative stress-strain curves of an exemplary low end synthetic polymer material labeled SP1, an exemplary high end synthetic polymer material labeled SP2 and an exemplary metal labeled METAL.

Low End Synthetic Polymer Materials SP1

Suitable low end synthetic polymer materials meet the following requirements:
1) Approved materials for an intended application class and its relevant technical standards
2) Yield strength $\upsilon$ from 5 MPa to 50 MPa in accordance with standard ISO 527 test procedure including testing at 23° C.
3) Longitudinal strain percentage at yield $\varepsilon$<15% in accordance with standard ISO 527 test procedure including testing at 23° C.

Suitable low end synthetic polymer materials include inter alia PP, HDPE, ABS, and the like.

High End Synthetic Polymer Materials SP2

Suitable high end synthetic polymer materials meet the following requirements:
1) Approved materials for an intended application class and its relevant technical standards
2) Yield strength $\upsilon$ from 50 MPa to 250 MPa in accordance with standard ISO 527 test procedure including testing at 23° C.
3) Longitudinal strain percentage at yield $\varepsilon$<10% in accordance with standard ISO 527 test procedure including testing at 23° C.
4) Yield strength $\upsilon$ at least twice the low end synthetic polymer material's yield strength at the maximum application class parameters
5) Longitudinal strain percentage at yield C smaller than the low end synthetic polymer material's longitudinal strain percentage at yield at the maximum application class parameters Suitable high end synthetic polymer include inter alia PPSU, PVDF, PA6/6, PEEK, and the like. Alternatively, the same low end synthetic polymer material used for housings can also be used for pipe tang sockets on the condition that the synthetic polymer material is compounded with a stiffening material, for example, a mineral, glass fibers, and the like, such that the low end synthetic polymer material becomes high end synthetic polymer material.

Metals

Suitable metals meet the following requirements:
1) Approved materials for an intended application class and its relevant technical standards
2) Yield strength $\upsilon$ from 50 MPa to 2,500 MPa in accordance with standard ISO 6892 test procedure including testing at 23° C.
3) Longitudinal strain percentage at yield $\varepsilon$<5% in accordance with standard ISO 6892 test procedure including testing at 23° C.
4) Yield strength $\upsilon$ at least twice the low end synthetic polymer material's yield strength at the maximum application class parameters
5) Longitudinal strain percentage at yield $\varepsilon$ smaller than the low end synthetic polymer material's longitudinal strain percentage at yield at the maximum application class parameters Suitable metals include steel, brass, aluminum, stainless steel, and the like.

While the invention has been described with respect to a limited number of embodiments, it will be appreciated that many variations, modifications, and other applications of the invention can be made within the scope of the appended claims.

The invention claimed is:

1. An installation fitting for use in a domestic water supply pipe system of a predetermined application class, the predetermined application class having maximum application class parameters in accordance with a required technical standard, the application class comprising one of:
   Class 1, having maximum application class parameters comprising a maximum temperature of 80° C. and a maximum pressure of 10 Bar;
   Class 2, having maximum application class parameters comprising a maximum temperature of 80° C. and a maximum pressure of 10 Bar;
   Class 4, having maximum application class parameters comprising a maximum temperature of 70° C. and a maximum pressure of 10 Bar; and
   Class 5 having maximum application class parameters comprising a maximum temperature of 90° C. and a maximum pressure of 10 Bar, the installation fitting for use with a plastic pipe having an internal peripheral pipe surface and an annular pipe end surface, the installation fitting comprising:

(a) a housing having a composite structure including:
   i) at least one pipe end having a pipe tang with an external peripheral pipe tang surface, an internal peripheral pipe tang surface and an annular pipe tang end surface, said external peripheral pipe tang surface having a spaced apart pair of annular sealing ring grooves, and
   ii) a tubular socket disposed inside each said pipe tang underlying its said annular sealing ring grooves, said socket having a continuous external peripheral socket surface lining said internal peripheral pipe tang surface, and said socket having a leading annular socket end surface and a trailing annular socket end surface correspondingly adjacent and remote from said annular pipe tang end surface, said housing being manufactured from synthetic polymer material having a yield strength υ from 5 MPa to 50 MPa and a longitudinal strain percentage at yield ε<15% in accordance with ISO 527 test procedure, said socket being manufactured from either:
   (i) synthetic polymer material having a yield strength υ from 50 MPa to 250 MPa and a longitudinal strain percentage at yield ε<10% in accordance with ISO 527 test procedure; or
   (ii) metal material having a yield strength υ from 50 MPa to 2,500 MPa and a longitudinal strain percentage at yield ε<5% in accordance with standard ISO 6892 test procedure, said socket material further having:
   i) a yield strength υ at least twice said housing material's yield strength at said maximum application class parameters, and
   ii) a longitudinal strain percentage ε at yield smaller than said housing material's longitudinal strain percentage at yield at said maximum application class parameters; and (b) a spaced apart pair of sealing rings respectively mounted in each of said pair of annular sealing ring grooves for sealing against the internal peripheral pipe surface on forced sliding mounting the pipe on said pipe tang overlying said tubular socket disposed therein and together forming said composite structure before said forced sliding mounting.

2. The fitting according to claim 1, wherein said leading annular socket end surface includes an annular socket flange for covering at least an inner rim of said annular pipe tang end surface.

3. The fitting according to claim 2, wherein said external peripheral socket surface includes at least one engagement feature towards said trailing annular socket end surface for mechanically engaging said internal peripheral pipe tang surface.

4. An induction welding installation fitting comprising the installation fitting according to claim 2.

5. A compression fit installation fitting comprising the installation fitting according to claim 2.

6. A press fit installation fitting comprising the installation fitting according to claim 2.

7. A slide fit installation fitting comprising the installation fitting according to claim 2.

8. A push fit installation fitting comprising the installation fitting according to claim 2.

9. The fitting according to claim 1, wherein said external peripheral socket surface includes at least one engagement feature towards said trailing annular socket end surface for mechanically engaging said internal peripheral pipe tang surface.

10. An induction welding installation fitting comprising the installation fitting according to claim 9.

11. A compression fit installation fitting comprising the installation fitting according to claim 9.

12. A press fit installation fitting comprising the installation fitting according to claim 9.

13. A slide fit installation fitting comprising the installation fitting according to claim 9.

14. A push fit installation fitting comprising the installation fitting according to claim 9.

15. An induction welding installation fitting comprising the installation fitting according to claim 1.

16. A compression fit installation fitting comprising the installation fitting according to claim 1.

17. A press fit installation fitting comprising the installation fitting according to claim 1.

18. A slide fit installation fitting comprising the installation fitting according to claim 1.

19. A push fit installation fitting comprising the installation fitting according to claim 1.

* * * * *